United States Patent
Ameta et al.

(10) Patent No.: US 12,159,390 B2
(45) Date of Patent: Dec. 3, 2024

(54) IMAGE-BASED DEFECT DETECTIONS IN ADDITIVE MANUFACTURING

(71) Applicant: Siemens Industry Software Inc., Plano, TX (US)

(72) Inventors: Gaurav Ameta, Robbinsville, NJ (US); Suraj Ravi Musuvathy, Princeton Junction, NJ (US); Elena Arvanitis, Somerville, NJ (US); David Madeley, Louth (GB); Omar Fergani, Berlin (DE); Tom van 't Erve, Enschede (NL); Livio Dalloro, Plainsboro, NJ (US)

(73) Assignee: Siemens Industry Software Inc., Plano, TX (US)

( * ) Notice: Subject to any disclaimer, the term of this patent is extended or adjusted under 35 U.S.C. 154(b) by 342 days.

(21) Appl. No.: 17/627,767

(22) PCT Filed: Jul. 25, 2019

(86) PCT No.: PCT/US2019/043411
§ 371 (c)(1),
(2) Date: Jan. 17, 2022

(87) PCT Pub. No.: WO2021/015782
PCT Pub. Date: Jan. 28, 2021

(65) Prior Publication Data
US 2022/0270236 A1 Aug. 25, 2022

(51) Int. Cl.
*G06T 7/00* (2017.01)
*B22F 10/366* (2021.01)
(Continued)

(52) U.S. Cl.
CPC .......... *G06T 7/0004* (2013.01); *B22F 10/366* (2021.01); *B22F 10/38* (2021.01);
(Continued)

(58) Field of Classification Search
CPC ......... G06T 7/0004; G06T 2207/20108; G06T 2207/30144; G06T 2207/30164;
(Continued)

(56) References Cited

FOREIGN PATENT DOCUMENTS

| CN | 108197384 A | 6/2018 |
|---|---|---|
| CN | 108463838 A | 8/2018 |

(Continued)

OTHER PUBLICATIONS

Kleszczynski et al., Error Detection in Laser Beam Melting Systems by High Resolution Imaging, 2012 Engineering, Materials Science. (Year: 2021).*

(Continued)

*Primary Examiner* — Said M Elnoubi

(57) ABSTRACT

A computing system may include an access engine and a defect detection engine. The access engine may be configured to access a slice contour of a given layer of a 3-dimensional (3D) object designed for manufacture through an additive manufacturing process and obtain hatch tracking for the slice contour, the hatch tracking representative of an energy path to melt metal powder for constructing the given layer through the additive manufacturing process. The defect detection engine may be configured to construct, from the slice contour, an as-built image for the given layer by rendering the hatch tracking in the slice contour; construct, from the slice contour, an idealized image for the given layer; and identify defects in the given layer via image analysis between the as-built image and the idealized image.

14 Claims, 5 Drawing Sheets

(51) Int. Cl.
| | |
|---|---|
| *B22F 10/38* | (2021.01) |
| *B22F 10/85* | (2021.01) |
| *B22F 12/90* | (2021.01) |
| *B29C 64/153* | (2017.01) |
| *B29C 64/393* | (2017.01) |
| *B33Y 10/00* | (2015.01) |
| *B33Y 50/02* | (2015.01) |
| *G06F 30/20* | (2020.01) |
| *B22F 10/28* | (2021.01) |
| *G06F 113/10* | (2020.01) |

(52) U.S. Cl.
CPC .............. *B22F 10/85* (2021.01); *B22F 12/90* (2021.01); *B29C 64/153* (2017.08); *B29C 64/393* (2017.08); *B33Y 10/00* (2014.12); *B33Y 50/02* (2014.12); *G06F 30/20* (2020.01); *B22F 10/28* (2021.01); *G06F 2113/10* (2020.01); *G06T 2207/20108* (2013.01); *G06T 2207/30144* (2013.01); *G06T 2207/30164* (2013.01)

(58) Field of Classification Search
CPC . G06T 2207/20224; G06T 2207/30116; B22F 10/366; B22F 10/38; B22F 10/85; B22F 12/90; B22F 10/28; B29C 64/153; B29C 64/393; B33Y 10/00; B33Y 50/02; G06F 30/20; G06F 2113/10; Y02P 10/25
See application file for complete search history.

(56) References Cited

FOREIGN PATENT DOCUMENTS

| CN | 108760747 A | 11/2018 |
|---|---|---|
| CN | 109128824 A | 1/2019 |
| WO | 2017141070 | 8/2017 |

OTHER PUBLICATIONS

Li et al., In Situ 3D Monitoring of Geometric Signatures in the Powder-Bed-Fusion Additive Manufacturing Process via Vision Sensing Methods, Apr. 12, 2018, Sensors 2018 (Year: 2018).*
PCT Search Report dated Feb. 20, 2020, for PCT Application No. PCT/US2019/043411, 14 pages.
Tesfaye Moges et al: "A Review of Model Inaccuracy and Parameter Uncertainty in Laser Powder Bed Fusion Models and Simulations", Journal of Manufacturing Science and Engineering, vol. 141, No. 4, Feb. 28, 2019 (Feb. 28, 2019), XP055666376, 14 pages.
Sofiane Guessasma et al: "Challenges of additive manufacturing technologies from an optimisation perspective", International Journal for Simulation and Multidisciplinary Design Optimization, vol. 6, Jan. 1, 2015 (Jan. 1, 2015), 14 pages.
Borish Michael et al: "Defect Identification and Mitigation Via Visual Inspection in Large-Scale Additive Manufacturing", JOM: Journal of Metals, Springer New York LLC, United States, vol. 71, No. 3, Nov. 13, 2018 (Nov. 13, 2018), XP036703617 / Nov. 13, 2018, 7 pages.
Li Dichen et al; "High Temperature Turbine Blade Additive Manufacturing Technology"; University Press; published: Oct. 31, 2016.

* cited by examiner

IMAGE-BASED DEFECT DETECTIONS IN ADDITIVE MANUFACTURING

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design and simulated testing of product structures and product manufacture.

BRIEF DESCRIPTION OF THE DRAWINGS

Certain examples are described in the following detailed description and in reference to the drawings.

DETAILED DESCRIPTION

Figure 1:
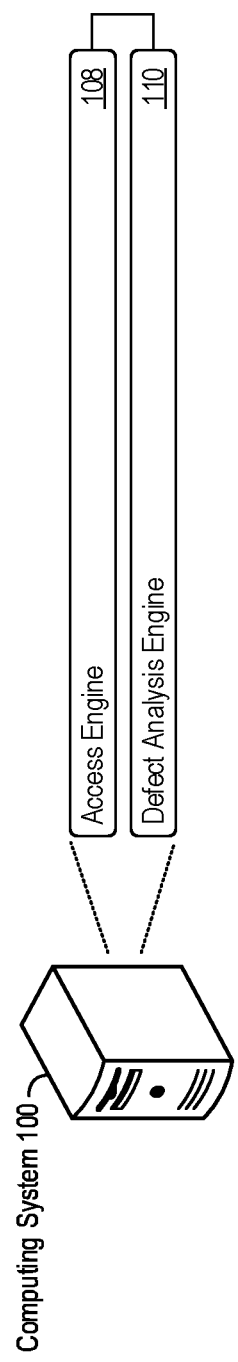
FIG. 1 shows an example of a computing system that supports image-based defect detections in additive manufacturing.

Additive manufacturing (sometimes referred to as 3-dimensional or 3D printing) may be performed through use of 3D printers that can construct objects. Some forms of additive manufacturing is laser powder bed fusion, in which a laser can be used as a power source to sinter/melt powdered material (e.g., metal powder) laid up on a powder bed or build platform. As successive layers of metal powder are added to the powder bed and sintered by the laser, a product is additively manufactured in a layer-by-layer manner. Various additive manufacturing techniques use application of a heat or energy source on powder beds to additively construct an object, including laser powder bed fusion, selective laser melting (SLM), selective laser sintering (SLS), electron beam melting (EBM), and more. As used herein, energy-based processes may refer to any additive manufacturing processes that applies an energy source (e.g., laser or electron beam) to melt powder laid up on a powder bed or build platform (e.g., in contrast to deposition-based additive manufacturing processes that deposit already-melted material in the form of beads).

In additive manufacturing processes (including laser powder bed fusions, SLM, SLS, and EBM), digital product designs are often used to support physical manufacture. For instance, a digital 3-dimensional (3D) geometry of part can be sliced into 2-dimensional (2D) layers by a CAM system or 3D printing system to guide physical manufacture of the part. These digitally sliced layers (also referred herein interchangeably as slices) may include slice contours that define boundaries of the part. For laser powder bed fusion, SLM, SLS, EBM, or any other energy-based processes, laser/electron beam pathing to sinter layers of metal powder may be computed for each layer, and any such energy pathing (e.g., a laser toolpath) may be referred to herein as hatch tracking, hatch tracks, or hatch patterning.

Hatch tracks may be computed from the slice contours of 2D layers, and may represent energy pathing (whether laser-based, electron-based, etc.) within the slice contours to sinter metal powder in order to physically construct each respective layer. Such hatch tracking may be limited in form to parallel vectors or other predetermined patterns, angled paths, or shapes. As slice contours are often composed of free-form curves, computed hatch tracking by CAM systems or build processors may be incapable of completely covering a slice contour. Moreover, computational errors during hatch tracking determinations may result in missing vectors within the slice contour, causing incomplete formation of a given layer during sintering or material deposition. Accordingly, part gaps, improperly fused metal powder, or other part defects may occur during physical part construction using incomplete or erroneous hatch trackings.

The disclosure herein may provide systems, methods, devices, and logic for image-based defect detections in additive manufacturing. As described in greater detail below, the image-based defect detection features disclosed herein may include rendering multiple digital images for sliced layers of a 3D geometry, including an as-built image based on rendering the hatch tracking determined for slice contours of a given layer as well as an idealized image constructed from the slice contours. Via image analysis, differences between the as-built and idealized images may be determined, which may correlate to physical defects that may be introduced to a part during physical manufacture of a given part layer. As such, the image-based defect detection features described herein may support gap and defect detection prior to physical manufacture, which may thus support defect analysis and correction without needless expending physical resources to construct defective parts. The image-based defect detection features described herein may thus provide manufacturing validations for 3D parts prior to physical construction and may increase the accuracy and efficiency at which 3D parts are constructed via additive manufacturing.

These and other image-based defect detection features and technical benefits are described in greater detail herein.

FIG. 1 shows an example of a computing system 100 that supports image-based defect detections in additive manufacturing. The computing system 100 may take the form of a single or multiple computing devices such as application servers, compute nodes, desktop or laptop computers, smart phones or other mobile devices, tablet devices, embedded controllers, and more. In some examples, the computing system 100 is part of or implements (at least in part) a CAM system or a 3D printing system, which may include a build processor. In that regard, the computing system 100 may support various 3D printing operations such as 3D object slicing, manufacturing validations, and the like, in order to support additive manufacture of parts.

As an example implementation to support any combination of the image-based defect detection features described herein, the computing system 100 shown in FIG. 1 includes an access engine 108 and a defect detection engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the access engine 108 may access a slice contour of a given layer of a 3D object designed for manufacture through an additive manufacturing process as well as obtain hatch tracking for the slice contour. As noted herein, the hatch tracking may be representative of an energy path to melt (e.g., sinter) metal powder for constructing the given layer through the additive manufacturing process. In operation, the defect detection engine 110 may construct, from the slice contour, an as-built image for the given layer by rendering the hatch tracking in the slice contour and construct, from the slice contour, an idealized image for the given layer. The defect detection engine 110 may further identify defects in the given layer via image analysis between the as-built image and the idealized image.

These and other image-based defect detection features according to the present disclosure are described in greater detail next. Many of the examples described herein using laser-based paths to melt or sinter powdered metal on a powder bed as an illustrative example. However, the image-based defect detection features described herein may be consistently applied for any energy-based additive manufacturing techniques that use hatch tracking for energy toolpaths (to path an electron beam instead of a laser).

Figure 2:
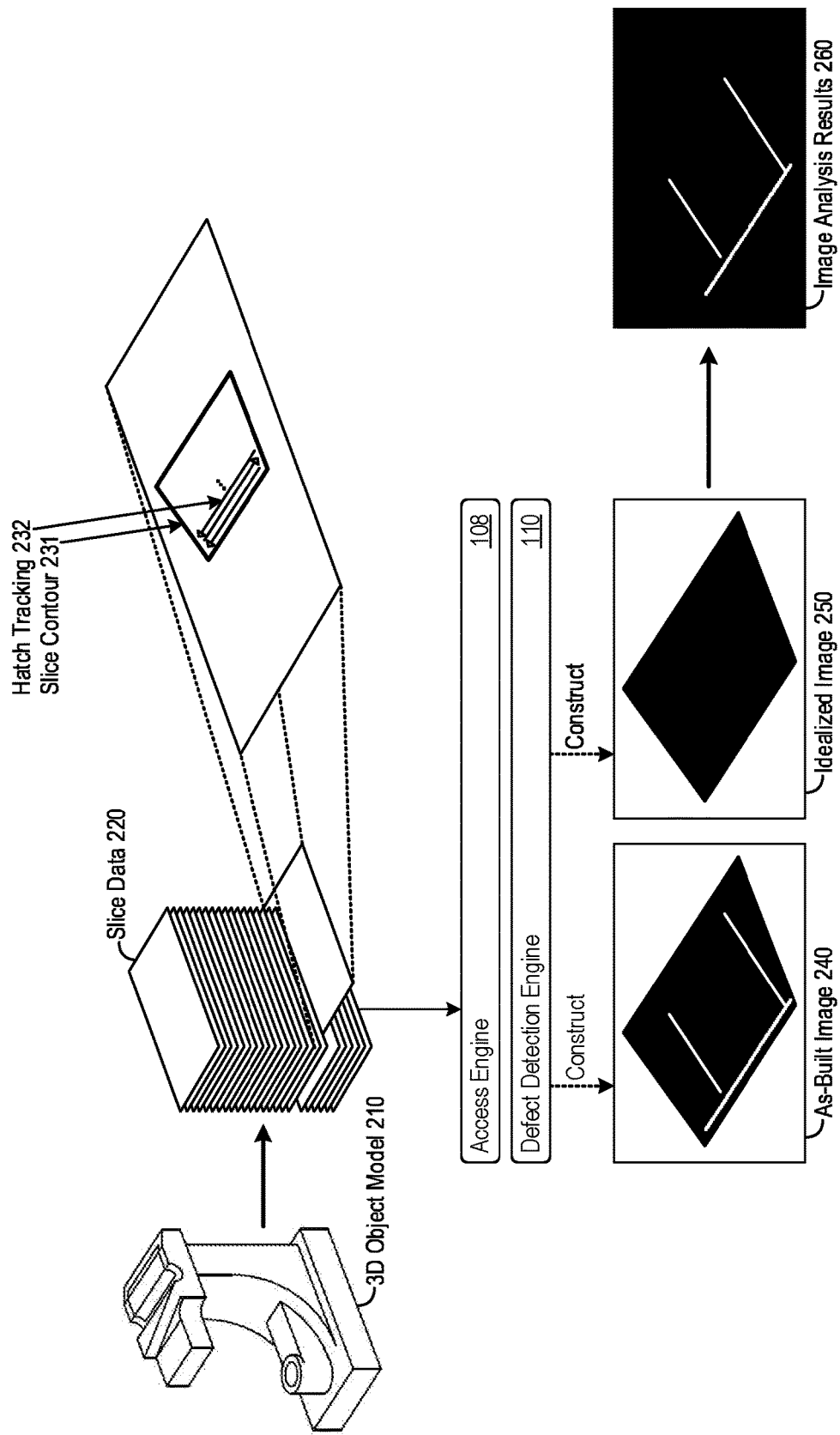
FIG. 2 shows examples of image-based defect detections that a computing system may perform for a 3D object model.

FIG. 2 shows examples of image-based defect detections that a computing system may perform for a 3D object model. In the particular example shown in FIG. 2, a computing system is illustrated in the form of an access engine 108 and a defect detection engine 110. However, other system implementations are contemplated herein.

To support defect detections that may be introduced during additive manufacturing, the access engine 108 may access slice data for a part design. The part design may take the form of a 3D geometry, such as the 3D object model 210 shown in FIG. 2. The 3D object model 210 may take the form of any suitable CAD format or CAD file, and may represent a 3D shape (e.g., geometry) of the part. In particular, the access engine 108 may access slice data 220 for the 3D object model 210, which may include slice contours and hatch tracking for any number of sliced layers of the 3D object model 210.

In some implementations, slice data 220 may be computed by a build processor of a 3D printing system or any suitable CAM system. The slice data 220 may take the form of 2D layers sliced from the 3D object model 210 for 3D printing of the part design represented by the 3D object model 210. Slice data 220 for each given layer (e.g., each given slice of the slice data 220) may include slice contours that represent external or internal boundaries of the part design at the given layer. The access engine 108 may retrieve, load, or otherwise access computed slice data 220 from CAM systems, build processors, or data structures used to store such slice data 220.

As part of the slice data 220, a build processor or CAM system may compute hatch tracking for layers of the 3D object model 210, and the hatch tracking may represent a determined laser path (for laser powder bed fusions) or electron beam path (for EBM processes) to physically construct the given layer via additive manufacturing. As such, the access engine 108 may obtain hatch tracking computed for the various layers of the 3D object model 210.

In the example shown in FIG. 2, slice contours and hatch tracking for an example layer in the slice data 220 are illustrated as the slice contour 231 and the hatch tracking 232.

Hatch tracking computations may be limited to specific forms, structures, or parameters imposed by CAM systems or build processors to guide pathing of a laser or other energy application tool. For instance, hatch tracking computed for a given layer may be limited in form to parallel vectors, predetermined shapes or angles, or other toolpath parameters that reduce the degree to which the computed hatch tracking can cover a free-form shape. Computation errors by a build processor or CAM system may also result in hatching errors, such as missing vectors, that also reduce coverage of pathing within the slice contour of a given layer. For laser powder bed fusion, EBM, SLS, SLM, and other energy-based processes, incomplete coverage of a given layer by computed hatch tracking may result in metal powder that is improperly melted, fused, or sintered, as the energy pathing may miss portions within the slice contour that are not (or only partially) covered by determined hatch tracking for the given layer.

To identify manufacture defects (e.g., gaps) that may result from deficient hatch patterning, the defect detection engine 110 may analyze slice data 220 of the 3D object model 210. In particular, the defect detection engine 110 may construct as-built and idealized images for sliced layers of a part design from accessed slice data 220. An as-built image constructed by the defect detection engine 110 may, in effect, represent a simulation of a build of a given layer by rendering (e.g., coloring) hatch tracking computed for the given layer to represent sintered metal powder formed for the given layer. An idealized image for the given layer may represent a complete or perfect construction of the given layer, e.g., without any gaps, defects, or manufacture imperfections resulting from inaccurate or incomplete hatch tracking for the given layer.

To construct the as-built image for a given layer of the 3D object model 210, the defect detection engine 110 may create an image representation of the slice contour(s) of the given layer. For instance, slice data 220 generated by a CAM system or build processor may include a slice contour 231 for a given layer, which the defect detection engine 110 may capture in any suitable image format (e.g., .jpg, .png, bitmaps, any CAD or CAM-based image representations, and the like). Then, the defect detection engine 110 may render the hatch tracking 232 for the given layer to construct the as-built image. That is, the defect detection engine 110 may color the hatch tracking 232 in the digital image to represent a simulated coverage of laser or electron beam-based sintering during physical manufacture of the given layer.

Rendering of the hatch tracking 232 for a given layer may be performed in various ways by the defect detection engine 110. In some implementations, the defect detection engine 110 may render the hatch tracking 232 at a constant color width as specified by a melt pool width parameter for the additive manufacturing process. The melt pool width parameter may be a configurable parameter, e.g., as specified by a user for use in defect detection rendering of the hatch tracking 232 (e.g., at constant value of 100 or 150 micrometers for rendering the hatch tracking 232). Based on a specified melt pool width parameter, the defect detection engine 110 may color over portions of a slice contour digital image along the hatch tracking 232 at a constant color (e.g., pixel) width, doing so in accordance with the specified melt pool width.

Put another way, the defect detection engine 110 may apply a fixed color (e.g., white) at a fixed pixel width (e.g., 5 pixels) along the hatch tracking computed for a given layer. In that regard, the defect detection engine 110 may overlay or render a line with the constant pixel width over the hatch tracking for a given layer at a particular alignment with the hatch tracking (e.g., centered on the hatch tracking, with the hatch tracking aligned at the left or right of the rendered line, or at a preconfigured pixel offset with respect to the hatch tracking). Such a rendering implementation via a constant color width (based on a preconfigured and constant melt pool width parameter) may increase the speed at which as-built images are constructed by allowing rendering of hatch tracking to be performed with simpler coloring operations and increased speed. As-build image rendering at increased speeds may be particularly useful as the hatch trackings computed for a given layer may number into the millions (or more), and more complex rendering operations or simulations may result in increased (and possibly unacceptable or non-practical) processing times.

As another example implementation, the defect detection engine 110 may render the hatch tracking 232 for a given layer at a variable color width according to a statistical function that models a melt pool width of an additive manufacturing process. The statistical function may compute a melt powder width at different portions of the given layer based at least on laser power, laser speed, and metal powder characteristics to be used in the additive manufacturing process. For non-laser energy-based processes, the statistical function may instead account for energy parameters and characteristics of these processes instead, such as electron beam intensities, speed, etc. Any such characteristics and any other parameters of the additive manufacturing processes may be configurable, and the statistical function may account for such parameters in determining a melt pool width for coloring the hatch tracking 232 at various points in the given layer. This example rendering implementation via a statistical function may increase the accuracy at which a given layer is simulated and represented as the as-built image, which may allow for finer defect detection capabilities at increased granularity and accuracy.

As the size of gaps or defects in additive manufacturing processes may be relatively small (e.g., on the order of micrometers), the defect detection engine 110 may render the as-built image at an image resolution capable to visualize sintering or deposition gaps of a threshold size. In some instances, the defect detection engine 110 may render the as-built image at a predetermined resolution (e.g., 100,000× 100,000 pixels) such that gaps of a threshold size are visualized in the as-built image. As another example, defect detection engine 110 may determine an image resolution for the as-built image at a configurable or predetermined physical size-to-pixel ratio, e.g. at a 2 micrometer$^2$-per-pixel ratio. In such examples, the physical size of the 3D object model 210 (e.g., at a given slice) may control the image resolution at which the defect detection engine 110 constructs the as-built image.

As yet another example, the defect detection engine 110 may determine an image resolution for the as-built image based on a predetermined pixel width for the melt pool width parameter. To illustrate, the defect detection engine 110 may assign a pixel width of 50 pixels to a constant melt pool width parameter (and thus a 100 micrometer width pool parameter will result in a determined image resolution of 0.5 micrometer-per-pixel width ratio). In some implementations, a configurable parameter may specify a minimum acceptable gap width (e.g., 0.5 micrometers), and the defect detection engine 110 may determine an image resolution for the as-built image such that any gaps greater in size than the minimum acceptable gap width are visualized in the as-built image (e.g., at a 0.45 micrometer-per-pixel width ratio, ensuring that gaps at the minimum acceptable gap width of 0.5 micrometers are visualized by at least 1 image pixel).

At detailed image resolutions, construction of the as-built image by the defect detection engine 110 may be computationally expensive. In some examples, the defect detection engine 110 may utilize parallel computing to support construction of the as-built image with increased speed. For a given layer, the computed hatch tracking 232 may number in the millions of vectors (or more), and the defect detection engine 110 may leverage multi-threading capabilities of multi-central processing unit (CPU) systems or multi-graphical processing unit (GPU) systems to decrease overall computational latency in generating as-built images for a given layer of a 3D geometry.

Accordingly, the defect detection engine 110 may support construction of an as-built image for a given layer of the 3D object model 210.

To support image-based defect detections, the defect detection engine 110 may also construct an idealized image of a given layer. To do so, the defect detection engine 110 may capture the slice contour 231 of the given layer in a suitable image format and color the image to represent an ideal build of the given layer. In particular, the defect detection engine 110 may construct the idealized image for the given layer by completely coloring the interior of the slice contour 231, e.g., via a flood fill operation to color the image. A complete coloring may represent an idealized build in that the given layer is entirely sintered/constructed within the part boundary represented by the slice contour 231 of the given layer. The defect detection engine 110 may construct the idealized image of the given layer at an identical image resolution as the as-built image for the given layer, and do so in a manner such that the slice contour 231 is consistently positioned and aligned (e.g., at identical image locations) for both the as-built image and idealized image.

In any of the ways described herein, the defect detection engine 110 may construct an as-built image and an idealized image for a given layer of a 3D geometry. Examples of such images are respectively depicted in FIG. 2 as the as-built image 240 and idealized image 250. In the as-built image 240 shown in FIG. 2, the slice contour 231 and the hatch tracking 232 for a given layer are rendered (e.g., colored) in black by the defect detection engine 110 to represent a physical build of the given layer via the computed hatch tracking 232. Non-black (e.g., white) portions of the as-built image 240 indicate portions of the given layer that the hatch tracking 232 fails to cover, and which may result in gaps or defects during layer construction. In contrast, the idealized image 250 is flood filled with a black coloring within the slice contour 231 by the defect detection engine 110, which may represent an ideal construction of the given layer without any gaps or defects.

The defect detection engine 110 may perform an image analysis between the as-built image 240 and the idealized image 250 for a given layer to identify build defects that may result during physical manufacture. As the defect detection engine 110 may render the as-built image 240 and the idealized image 250 with aligned contour positioning and image resolutions, an image difference operation may be performed to identify discrepancies between the constructed images. Image difference operations may, for example, subtract pixel color values between images to identify areas that differentiated regions between the images.

An example of image analysis results 260 are shown in FIG. 2, which the defect detection engine 110 may compute or determine based on performed image difference operations between the as-built image 240 and idealized image 250. In the image analysis results 260, sinter or deposition gaps present in the as-built image 240 as illustrated in white coloring, which may result from missing or incomplete vector hatching paths in the hatch tracking 232. As such, the defect detection engine 110 may identify gaps and defects that may be introduced during physical manufacture of a given layer of the 3D object model 210.

In some examples, the defect detection engine 110 may further analyze the image analysis results 260 to determine defect characteristics for the given layer. For instance, the defect detection engine 110 may identify a number of pixels, size, width, length, or other image characteristics from the image analysis results 260 for the defects (e.g., gaps colored in white). Based on the image analysis results 260 and image resolution, the defect detection engine 110 may compute defect characteristics in physical measures (e.g., instead of pixels), including a gap count numbering the amount of detected gaps, gap ranges identifying a number of gaps within various size ranges, gap statistics such as a maximum, minimum, or average size of gaps for a given layer, a gap percentage of the given layer (can also be referred to as a deficiency percentage), and more.

Visual tools, such as graphs, charts, and histograms may be utilized by the defect detection engine 110 to present gap or defect analysis results to a user via a user interface. Tables 1, 2, and 3 below provide illustrative examples of defect statistics that the defect detection engine 110 may compute or present to a user, whether for a particular layer (e.g., Table 1) or for multiple layers (e.g., Tables 2 and 3).

TABLE 1

Example computed gap size ranges for a given layer of a 3D object model
Layer 9

| Range (micrometers$^2$) | Frequency (Number) |
| --- | --- |
| 0.000-0.125 | 295 |
| 0.125-0.250 | 4 |
| 0.250-0.375 | 4 |
| 0.375-0.500 | 0 |
| 0.500-0.625 | 2 |
| 0.625-0.750 | 1 |

TABLE 2

Example computed gap statistics for multiple layers of a 3D object model

| Layer | Gap Count | Average Area | Min Gap Area | Max Gap Area |
| --- | --- | --- | --- | --- |
| 1 | 320 | 0.02956543 | 0.000313 | 0.665313 |
| 2 | 449 | 0.01559779 | 0.000313 | 0.456563 |
| 3 | 349 | 0.02250716 | 0.000313 | 0.486875 |
| 4 | 384 | 0.02059244 | 0.000313 | 0.611563 |
| 5 | 317 | 0.02994479 | 0.000313 | 1.098752 |
| 6 | 471 | 0.01592360 | 0.000313 | 0.469588 |

TABLE 3

Example computed deficiency percentages for multiple layers of a 3D object model based on different melt pool width parameters used to construct as-built images

| | Melt Pool Width | |
| --- | --- | --- |
| Layer | 100.0 Deficiency % | 150.0 Deficiency % |
| 1 | 14.846 | 1.008 |
| 2 | 15.148 | 0.091 |
| 3 | 28.231 | 0.250 |
| 4 | 28.073 | 0.168 |
| 5 | 15.009 | 0.924 |
| 6 | 15.423 | 0.092 |

Accordingly, the defect detection engine 110 may compute various defect statistics and visualize the computed defect statistics in any number of ways.

While the example shown in FIG. 2 depicts a single as-built image 240 for a given layer, the defect detection engine 110 may construct multiple as-built images for the same layer of a 3D geometry. In doing so, the defect detection engine 110 may render the different as-built images with different rendering parameters. As one example, the defect detection engine 110 may render as-built images with different melt pool width parameters used to apply a constant color width along the hatch tracking 232 for the given layer. Doing so may support analysis and comparison on the effect of melt pool width on the construction of a given layer, e.g., by computing and comparing gap statistics for multiple as-built images rendered with different melt pool widths (e.g., a first as-built image rendered with a 100 micrometer melt pool width and a second as-built image rendered with a 150 micrometer melt pool width, both of which are used in image analyses with an idealized image for the given layer). An example of such analysis through multiple as-built images is shown above in Table 3.

As another feature, in some implementations the defect detection engine 110 may construct an as-built image for a given layer by accounting for multiple other layers in the 3D object model 210. By doing so, the defect detection engine 110 may account for thermal energy impacts from physicals construction of layers on top of (physically above along a build axis) a given layer of a manufactured part. During manufacture of layer 'i+1', thermal energy (e.g., from a laser or electron beam) may impact layer 'i'' as well, and this thermal energy may be applicable or observed for 'k' number of layers, e.g., layer 'i' is affected by layer 'i+1', layer 'i+2', . . . and so forth through layer 'i+k'. This parameter 'k' may be referred to as an additional layer parameter, which may be configurable by the defect detection engine 110 and which may control the extent to which the defect detection engine 110 accounts for additional layers in constructing the as-built image for a given layer 'i'.

To apply the additional layer parameter 'k', the defect detection engine 110 may construct the as-built image for layer 'i' by also rendering as-built images for 'k' additional layers, particular layers 'i+1' (directly above layer 'i'), 'i+2' (two layers above layer 'i'), and so on up through layer 'i+k' ('k' number of layers above layer 'i'). The defect detection engine 110 may aggregate the multiple as-built images into a single as-built image for layer 'i'. To do so, the defect detection engine 110 may additionally color the as-built image for layer 'i' based on the as-built images constructed for the 'k' additional layers. For each of the 'k' layers above the given layer 'i', the defect detection engine 110 may scale the color contribution of the additional layer in rendering the as-built image for layer 'i'. For instance, the defect detection engine 110 may linearly reduce the contribution of each successive layer above given layer 'i'. To illustrate via an example in which 'k'=4, layer 'i+1' may contribute to the as-built image of layer 'i' by 80% of the as-built image of layer 'i+1', layer 'i+2' may contribute 60%, layer 'i+3' may contribute 40%, and layer 'i+4' (that is 'i+k' in this example) may contribute 20%. In other examples, the defect detection engine 110 may reduce a contribution amount by a fixed amount or percentage factor for each successive layer above (e.g., 40% reduction between each layer).

Color contribution amounts for multiple layers may be implemented via color scaling in the as-built image constructed for a given layer 'i'. For instance, the defect detection engine 110 may render the as-built image for layer 'i' as a grayscale image, with coloring of hatch tracking for layer 'i' rendered at 100% contribution (e.g., white). Additionally, contributions from the 'k' layers above layer 'i' may be rendered by the defect detection engine in the as-built image for layer 'i' with scaling contributions based on a grayscale intensity value scaling between 100% (white value) and 0% (black value). As such, gaps present in the hatch tracking for given layer 'i' may be (at least partially) filled via contributions from the various 'k' layers above layer 'i', and the defect detection engine 110 may render an as-built image for layer 'i' by additionally accounting for 'k' number of layers above layer 'i'. A threshold grayscale value (e.g., 50% on the grayscale intensity value) may be used by the defect detection engine 110 to determine whether partially-filled gaps are sufficiently significant to impact part quality, and the threshold value may be user-configurable.

As described herein, an access engine 108 and defect detection engine 110 may provide image-based defect detections for part geometries to be physically constructed via additive manufacturing, such as through laser powder bed fusion, SLS, SLM, EBM, or other energy-based processes. Although some of the examples described herein are provided for a specific layer 'i', the access engine 108 and defect detection engine 110 may, in a consistent manner, support image analysis-based defect detections for some or all of the layers of a 3D object model 210.

The various image-based defect detection features described herein may provide an automated and efficient solution for defect detections prior to physical manufacture, and may be conveniently integrated as components or capabilities within a CAM system or 3D printing system (e.g., via machine-readable instructions and a build processor). As described herein, image-based defect detections may account for the impact of multiple different layers (e.g., up to 'k' number of additional layers), which may increase the capability and accuracy at which rendered as-built images can be compared to idealized images for gap and defect detections. Identified gaps, defects, and other part layer deficiencies may be addressed and corrected, e.g., via updated hatch tracking to address or fill the identified gaps and defects.

As other technical benefits, high resolution image construction of the as-built and idealized images may support defect detections at finer and configurable granularities, and may also allow for adaptation of physical additive manufacturing parameters to more efficiently and effectively manufacture parts. Also, the image-based defect detection features described herein may support parallelized rendering of hatch tracking using multi-threaded implements on CPUs or GPUs, and may thus support defect detections with increased speed and efficiency.

Accordingly, the image-based defect detection features described herein may be implemented via various technical features that provide various technical benefits and results.

Figure 3:
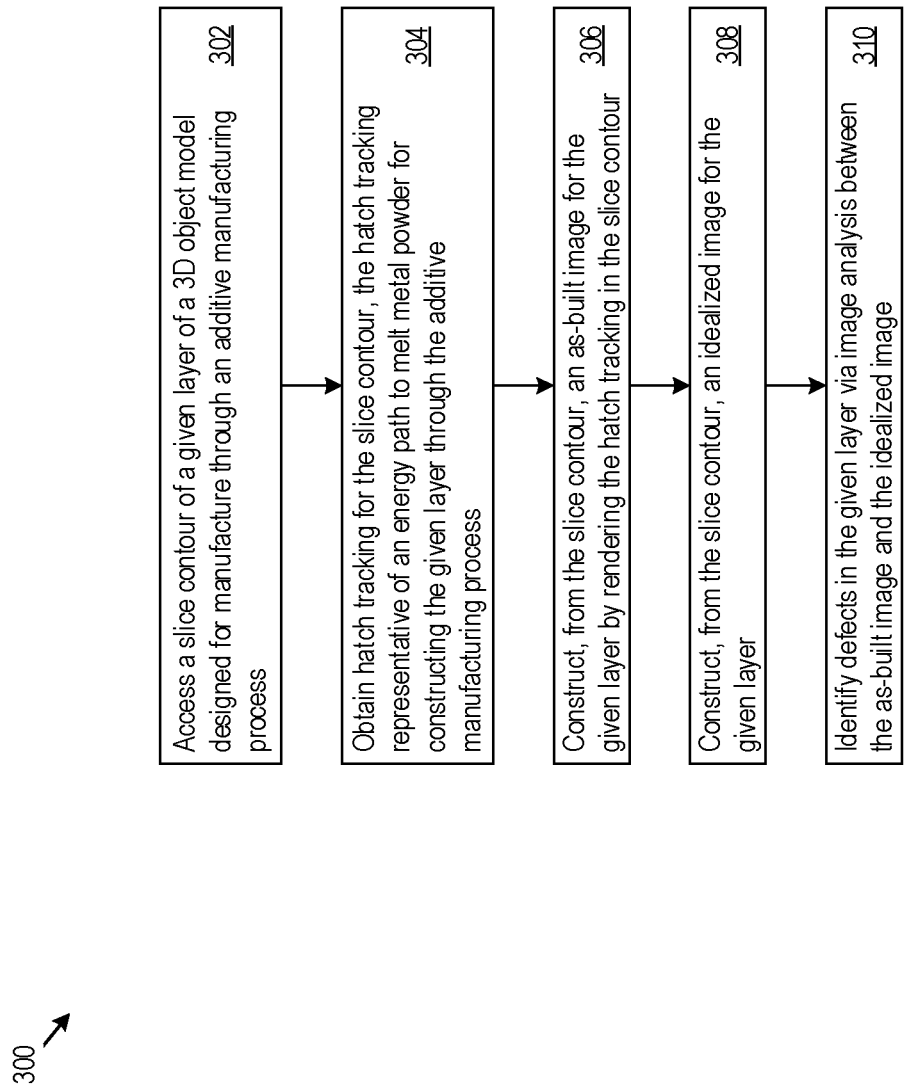
FIG. 3 shows an example of logic that a system may implement to support image-based defect detections in additive manufacturing.

FIG. 3 shows an example of logic 300 that a system may implement to support image-based defect detections in additive manufacturing. For example, the computing system 100 may implement the logic 300 as hardware, executable instructions stored on a machine-readable medium, or as a combination of both. The computing system 100 may implement the logic 300 via the access engine 108 and the defect detection engine 110, through which the computing system 100 may perform or execute the logic 300 as a method to support image-based defect detections in additive manufacturing. The following description of the logic 300 is provided using the access engine 108 and the defect detection engine 110 as examples. However, various other implementation options by systems are possible.

In implementing the logic 300, the access engine 108 may access a slice contour of a given layer of a 3D object designed for manufacture through an additive manufacturing process (302) as well as obtain hatch tracking for the slice contour, the hatch tracking representative of an energy path to melt metal powder for constructing the given layer through the additive manufacturing process (304).

In implementing the logic 300, the defect detection engine 110 may construct, from the slice contour, an as-built image for the given layer by rendering the hatch tracking in the slice contour (306) as well as construct, from the slice contour, an idealized image for the given layer (308). The defect detection engine 110 may further identify defects in the given layer via image analysis between the as-built image and the idealized image (310).

Figure 4:
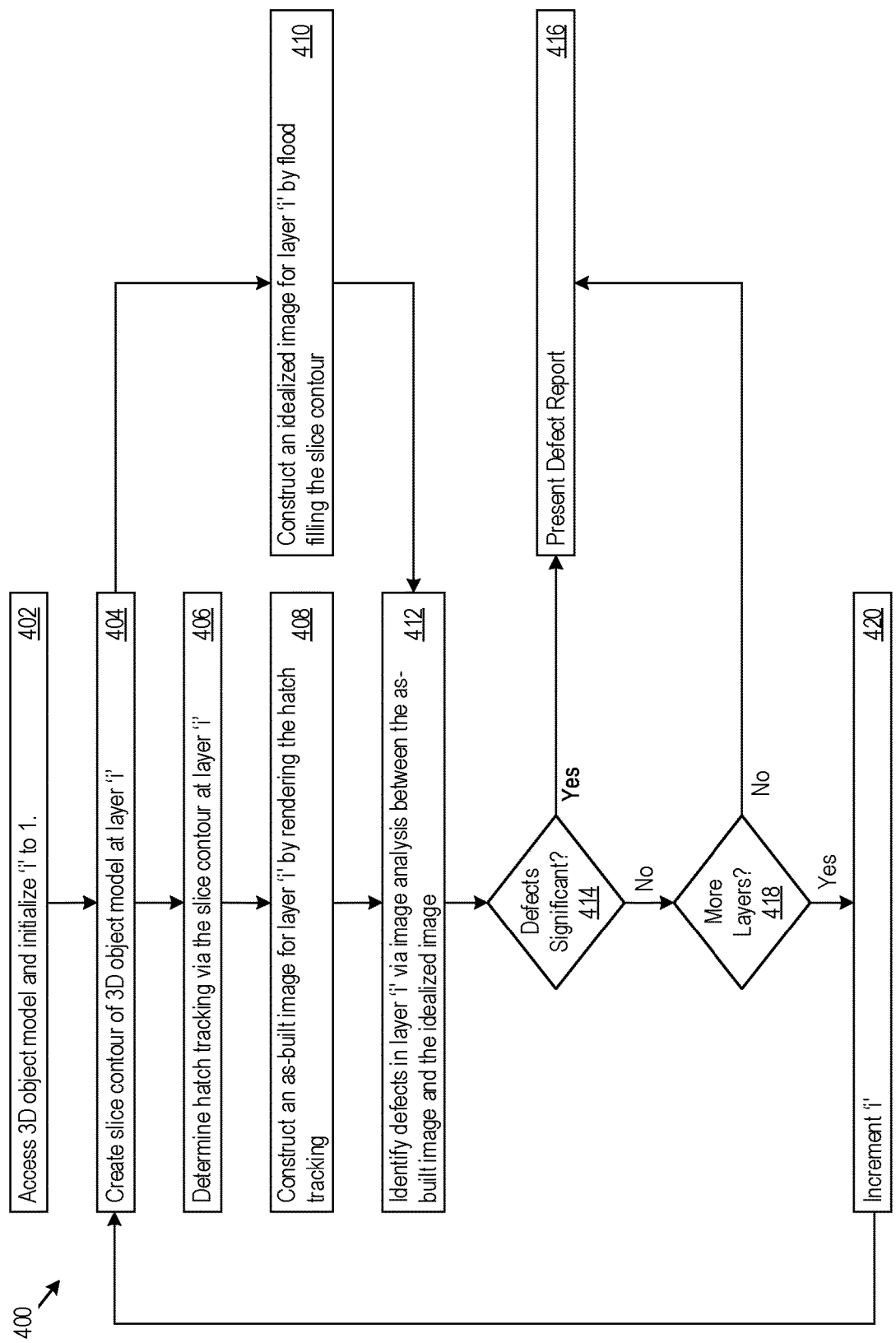
FIG. 4 shows another example of logic that a system may implement to support image-based defect detections in additive manufacturing.

FIG. 4 shows another example of logic 400 that a system may implement to support image-based defect detections in additive manufacturing. For example, the computing system 100 may implement the logic 400 as hardware, executable instructions stored on a machine-readable medium, or as a combination of both. The computing system 100 may implement the logic 400 via the access engine 108 and the defect detection engine 110, through which the computing system 100 may perform or execute the logic 400 as a method to support image-based defect detections in additive manufacturing. The following description of the logic 400 is provided using the access engine 108 and the defect detection engine 110 as examples. However, various other implementation options by systems are possible.

In implementing the logic 400, the access engine 108 may access a 3D object model (which may be any 3D part geometry) and initialize a layer variable 'i' (402). The layer variable 'i' may track a current layer of the 3D object model being analyzed for defect detection. The access engine 108 may also create a slice contour of the 3D object model at layer 'i' (404). To do so, the access engine 108 may implement any number of build processor or CAM capabilities to slice a 3D geometry into layers for construction via additive manufacturing. The slice contour may represent part boundaries for construction of layer 'i' of 3D object model, and the access engine 108 may determine hatch tracking via the slice contour at layer 'i' (406). The access engine 108 may compute the hatch tracking via any number of CAM or build processor capabilities.

In implementing the logic 400, the defect detection engine 110 may construct an as-built image for layer 'i' by rendering the hatch tracking for layer 'i' (408), and doing so in any of the ways described herein. In some instances, the defect detection engine 110 renders multiple as-built images for layer 'i', e.g., different as-built images rendered using different color widths based on different melt pool width parameters. As described in various ways herein, the defect detection engine 110 may construct an as-built image for layer 'i' accounting for 'k' number of additional layers physically constructed on top of (e.g., above) layer 'i'.

The defect detection engine 110 may also construct an idealized image for layer 'i' by flood filling the slice contour for layer 'i' (410). Then, the defect detection engine 110 may identify defects in layer 'i' via image analysis between the as-built image(s) and the idealized image (412). In some implementations, the defect detection engine 110 may determine whether the defects identified in layer 'i' are significant (414), e.g., as measured according to a significance factor. The significance factor may specify a threshold deficiency % in layer 'i' (e.g., greater than 5%), a threshold gap number (e.g., more than 100 gaps), a threshold maximum, minimum, or average gap size (e.g., 200 square micrometers), or any other configurable value by which the defect detection engine 110 may assess defect significance.

By doing so, the defect detection engine 110 may reduce resource consumption and increase analysis efficiency by providing a capability to stop a defect detection process upon identification of significant defects at a given layer 'i'. Responsive to determination that identified defects are sufficiently significant, the defect detection engine 110 may present a defect report (416), which may include any of the computed gap or defect statistics and/or highlight the significant defects identified for the layer. As noted above, the defect detection engine 110 may stop the defect detection process as well, conserving computation resources without (unnecessarily) performing defect detections for additional layers of a 3D geometry.

Responsive to a determination that the detected defects of layer 'i' are not significant (e.g., as measured by the significance factor), the defect detection engine 110 may determine whether additional layers remain in the 3D object model to process (418). If not, the defect detection engine 110 may increment the value of 'i' (420) and continue the defect detection process for the next layer in the 3D object model.

The logic 300 and 400 shown in FIGS. 3 and 4 provide illustrative examples by which a computing system 100 may support image-based defect detections in additive manufacturing. Additional or alternative steps in the logic 300 or 400 are contemplated herein, including according to any features described herein for the access engine 108, defect detection engine 110, or any combinations thereof.

Figure 5:
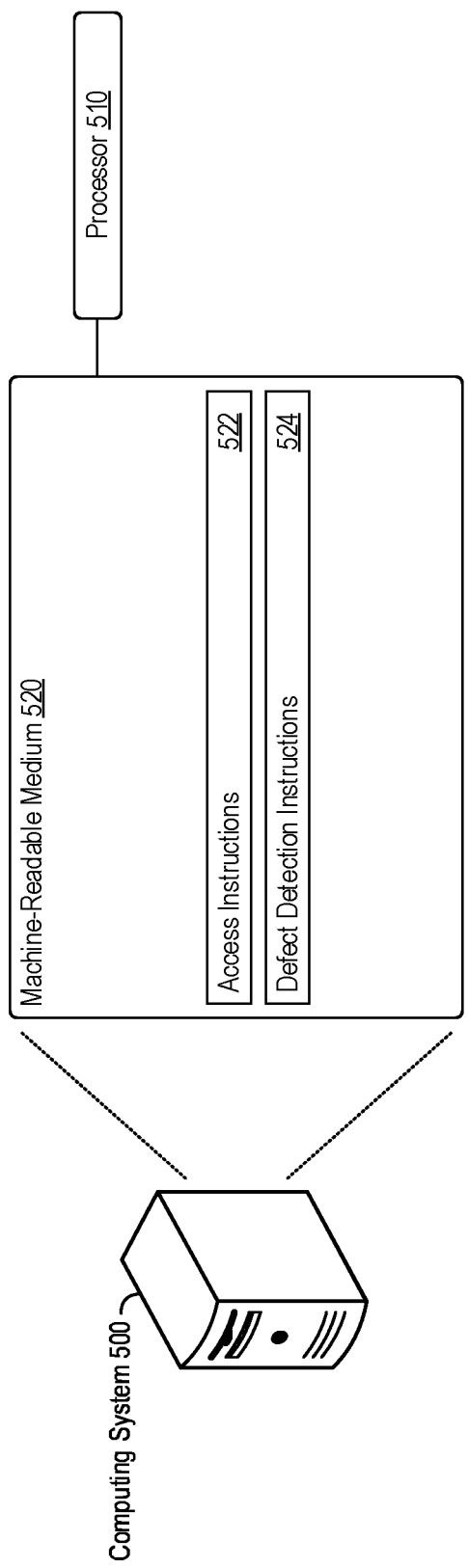
FIG. 5 shows an example of a computing system that supports image-based defect detections in additive manufacturing.

FIG. 5 shows an example of a computing system 500 that supports image-based defect detections in additive manufacturing. The computing system 500 may include a processor 510, which may take the form of a single or multiple processors. The processor(s) 510 may include a central processing unit (CPU), microprocessor, or any hardware device suitable for executing instructions stored on a machine-readable medium. The system 500 may include a machine-readable medium 520. The machine-readable medium 520 may take the form of any non-transitory electronic, magnetic, optical, or other physical storage device that stores executable instructions, such as the access instructions 522 and the defect detection instructions 524 shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor 510. Executing the instructions (e.g., the access instructions 522 and/or the defect detection instructions 524) may cause the computing system 500 to perform any of the image-based defect detection features described herein, including according to any of the features with respect to the access engine 108, the defect detection engine 110, or a combination of both.

For example, execution of the access instructions 522 by the processor 510 may cause the computing system 500 to access a slice contour of a given layer of a 3D object designed for manufacture through an additive manufacturing process and obtain hatch tracking for the slice contour, the hatch tracking representative of an energy path to melt metal powder for constructing the given layer through the additive manufacturing process. Execution of the defect detection instructions 524 by the processor 510 may cause the computing system 500 to construct, from the slice contour, an as-built image for the given layer by rendering the hatch tracking in the slice contour; construct, from the slice contour, an idealized image for the given layer; and identify defects in the given layer via image analysis between the as-built image and the idealized image.

Any additional or alternative features as described herein may be implemented via the access instructions 522, defect detection instructions 524, or a combination of both.

The systems, methods, devices, and logic described above, including the access engine 108 and the defect detection engine 110, may be implemented in many different ways in many different combinations of hardware, logic, circuitry, and executable instructions stored on a machine-readable medium. For example, the access engine 108, the defect detection engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the access engine 108, the defect detection engine 110, or combinations thereof.

The processing capability of the systems, devices, and engines described herein, including the access engine 108 and the defect detection engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
accessing a slice contour of a given layer of a 3-dimensional (3D) object model designed for manufacture through an additive manufacturing process;
obtaining hatch tracking for the slice contour, the hatch tracking representative of an energy-based path to melt metal powder for constructing the given layer through the additive manufacturing process;
constructing, from the slice contour, an as-built image for the given layer by rendering the hatch tracking in the slice contour, including by rendering the hatch tracking at a constant color width as specified by a melt pool width parameter for the additive manufacturing process;
constructing, from the slice contour, an idealized image for the given layer; and
identifying defects in the given layer via image analysis between the as-built image and the idealized image.

2. The method of claim 1, wherein constructing the as-built image for the given layer further comprises determining an image resolution for the as-built image such that a threshold size of a gap defect in the given layer is visualized by a threshold pixel width.

3. The method of claim 1, wherein constructing the as-built image for the given layer further comprises determining an image resolution for the as-built image based on a predetermined pixel width for the melt pool width parameter.

4. The method of claim 1, wherein constructing the idealized image for the given layer comprises flood filling the slice contour for the given layer.

5. The method of claim 1, wherein the image analysis comprises an image difference between the as-built image and the idealized image.

6. A system comprising:
a processor; and
a non-transitory machine-readable medium comprising instructions that, when executed by the processor, cause a computing system to:
access a slice contour of a given layer of a 3-dimensional (3D) object designed for manufacture through an additive manufacturing process; and
obtain hatch tracking for the slice contour, the hatch tracking representative of an energy path to melt metal powder for constructing the given layer through the additive manufacturing process;
construct, from the slice contour, an as-built image for the given layer by rendering the hatch tracking in the slice contour, including by rendering the hatch tracking at a constant color width as specified by a melt pool width parameter for the additive manufacturing process;
construct, from the slice contour, an idealized image for the given layer; and
identify defects in the given layer via image analysis between the as-built image and the idealized image.

7. The system of claim 6, wherein the defect detection engine is configured the instructions, when executed, cause the computing system to construct the as-built image for the given layer further by determining an image resolution for the as-built image such that a threshold size of a gap defect in the given layer is visualized by a threshold pixel width.

8. The system of claim 6, wherein the instructions, when executed, cause the computing system to construct the as-built image for the given layer further by determining an image resolution for the as-built image based on a predetermined pixel width for the melt pool width parameter.

9. The system of claim 6, wherein the instructions, when executed, cause the computing system to construct the idealized image for the given layer by flood filling the slice contour for the given layer.

10. The system of claim 6, wherein the image analysis comprises an image difference between the as-built image and the idealized image.

11. A non-transitory machine-readable medium comprising instructions that, when executed by a processor, cause a computing system to:
access a slice contour of a given layer of a 3-dimensional (3D) object designed for manufacture through an additive manufacturing process;
obtain hatch tracking for the slice contour, the hatch tracking representative of an energy path to melt metal powder for constructing the given layer through the additive manufacturing process;
construct, from the slice contour, an as-built image for the given layer by rendering the hatch tracking in the slice contour, including by rendering the hatch tracking at a constant color width as specified by a melt pool width parameter for the additive manufacturing process;
construct, from the slice contour, an idealized image for the given layer; and
identify defects in the given layer via image analysis between the as-built image and the idealized image.

12. The non-transitory machine-readable medium of claim 11, wherein the instructions cause the computing system to construct the as-built image for the given layer further by determining an image resolution for the as-built image such that a threshold size of a gap defect in the given layer is visualized by a threshold pixel width.

13. The non-transitory machine-readable medium of claim 11, wherein the instructions cause the computing system to construct the as-built image for the given layer further by determining an image resolution for the as-built image based on a predetermined pixel width for the melt pool width parameter.

14. The non-transitory machine-readable medium of claim 11, wherein the instructions cause the computing system to construct the idealized image for the given layer by flood filling the slice contour for the given layer.

* * * * *